(12) United States Patent
Ishida

(10) Patent No.: US 7,753,270 B2
(45) Date of Patent: Jul. 13, 2010

(54) STORING SYSTEM

(75) Inventor: Masato Ishida, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 413 days.

(21) Appl. No.: 11/817,079

(22) PCT Filed: Jan. 27, 2006

(86) PCT No.: PCT/JP2006/301292

§ 371 (c)(1),
(2), (4) Date: Aug. 24, 2007

(87) PCT Pub. No.: WO2006/090554

PCT Pub. Date: Aug. 31, 2006

(65) Prior Publication Data

US 2008/0283596 A1 Nov. 20, 2008

(30) Foreign Application Priority Data

Feb. 25, 2005 (JP) .............................. 2005-050407

(51) Int. Cl.
G06K 15/00 (2006.01)

(52) U.S. Cl. ...................... 235/383; 235/487; 235/385; 705/22; 705/28

(58) Field of Classification Search ................. 235/383, 235/375, 385, 487, 435; 705/22, 28, 29
See application file for complete search history.

(56) References Cited

U.S. PATENT DOCUMENTS

| 5,586,037 | A * | 12/1996 | Gil et al. | 705/407 |
| 7,278,569 | B2 * | 10/2007 | Cohen et al. | 235/378 |
| 2004/0046020 | A1 * | 3/2004 | Andreasson et al. | 235/385 |
| 2008/0088454 | A1 * | 4/2008 | Flores et al. | 340/572.4 |

FOREIGN PATENT DOCUMENTS

| JP | 2000128315 A | 5/2000 |
| JP | 200122834 A | 1/2001 |
| JP | 2003276809 A | 10/2003 |

OTHER PUBLICATIONS

International Search Report of PCT/JP2006/301292, date of mailing Apr. 11, 2006.

* cited by examiner

*Primary Examiner*—Edwyn Labaze
(74) *Attorney, Agent, or Firm*—Westerman, Hattori, Daniels & Adrian, LLP

(57) ABSTRACT

A storing apparatus (4) is provided with RFID readers (10, 11), and an ID of an article on a shelf (6) is read. Reading is performed when the shelf (6) is opened and at the time of closing it, and the ID of the article taken out and the ID of the article set are detected from a change made during the period. The ID of the article taken out or set is recorded as history information, and when the ID of the article is inappropriate, a monitor (28) gives warning.

8 Claims, 5 Drawing Sheets

STORING SYSTEM

TECHNICAL FIELD

The present invention relates a technique of monitoring storage and retrieval of articles in a storing system.

BACKGROUND ART

Techniques of attaching RFID readers to individual articles for tracking data of the individual articles are known. For example, in Patent Publication 1, when an incoming shipment of articles arrives, IDs of individual articles, i.e., ID tags of individual articles are read by RFID readers for inspection of the incoming articles.

It is assumed that RFIDs are used for confirming whether correct articles are taken out from racks, wagons, or the like. By holding the retrieved articles and stored articles over the RFID reader to read IDs of the articles, it is possible to track data of retrieval and storage of the articles. However, the task of holding each article over the ID reader is a considerable burden. So far, no apparatus which makes it possible to automatically read IDs of articles manually retrieved from, or stored in the racks, wagons, or the like without requiring operators to consciously read the IDs is known.

Patent Publication 1: Japanese Laid-Open Patent Publication No. 2002-104632

DISCLOSURE OF THE INVENTION

Problems to be Solved by the Invention

An object of the present invention is to make it possible to automatically read IDS of articles without holding the articles toward or over an ID reader, at the time of manually retrieving or storing the articles.

Another object of the present invention is to make it possible to reliably determine IDs of retrieved articles and stored articles.

Still another object of the present invention is to make it possible to issue a warning when a wrong article is retrieved or stored.

Still another object of the present invention is to make it possible to automatically generate a historical record of retrieval and storage of articles.

Means for Solving the Problems

According to the present invention, a storing system stores articles placed in a drawer, and the storing system comprises:

means for reading IDs of articles in the drawer after articles are retrieved from, or stored in the drawer, when the drawer is opened; and means for identifying the articles retrieved from, or stored in the drawer, based on a difference between the read IDs and IDs of articles in the drawer before retrieval or storage.

Since retrieval of articles is important in comparison with storage of articles, it may be sufficient to detect retrieval of articles from a drawer. At the time of reading IDs, for example, at the time of opening the drawer, and at the time of closing the drawer, the IDs are scanned by reading means such as an ID reader. However, the present invention is not limited in this respect. For example, each time the drawer is opened, and closed, IDs of articles in the drawer are read, and stored. By determining the difference, e.g., between a list of IDs read this time and a list of IDs read the previous time, it is possible to determine IDs of the articles taken out from the drawer this time. In the present invention, the "drawer" means any container which can be drawn (pulled out) from a storing apparatus body for retrieval or storage of articles, and returned to the storing apparatus body after retrieval or storage.

Preferably, the reading means scans IDs of articles at the time of opening the drawer, and at the time of closing the drawer, and the identifying means identifies the articles retrieved from, or stored in the drawer, based on a difference between the IDs at the time of opening the drawer and the IDs at the time of closing the drawer.

Preferably, the storing system further comprises means for checking appropriateness of the articles retrieved from, or stored in the drawer, and issuing a warning when any inappropriateness is found.

Preferably, the storing system further comprises means for creating a historical record of articles retrieved from, or stored in the drawer.

Advantages Of The Invention

In the present invention, at the time of opening the drawer, IDs of articles retrieved from, and IDs of articles stored in the drawer are read. Based on the difference between the IDs of the articles before retrieval or storage, and after retrieval or storage, the articles stored in the drawer, and the articles retrieved from the drawer are determined. In this manner, it is possible to automatically read the IDs without the need of holding each article to be retrieved from, or stored in the drawer over the ID reader.

In particular, at the time of opening the drawer and closing the drawer, the IDs of articles are scanned. By identifying the articles retrieved from, or stored in the drawer based on the difference between the article IDs before retrieval or storage and the article IDs after retrieval or storage, it is possible to determine the change in the article IDs during opening of the drawer, and simply and reliably identify the IDs of the articles retrieved from, or stored in the drawer. For example, in the case where the articles are retrieved from the drawer while the drawer is opened halfway, even if there is any article with unread ID hidden in the drawer, no problems occur.

In the case where appropriateness of the articles retrieved from, or stored in the drawer is checked, if any of the articles retrieved from, or stored in the drawer is not appropriate, a warning is issued. In this manner, it is possible to prevent retrieval or storage of wrong articles.

Further, in the case where a historical record for retrieval and storage is created, for example, even if wrong articles were retrieved, it is possible to detect the cause.

DESCRIPTION OF THE NUMERALS

Figure 1:
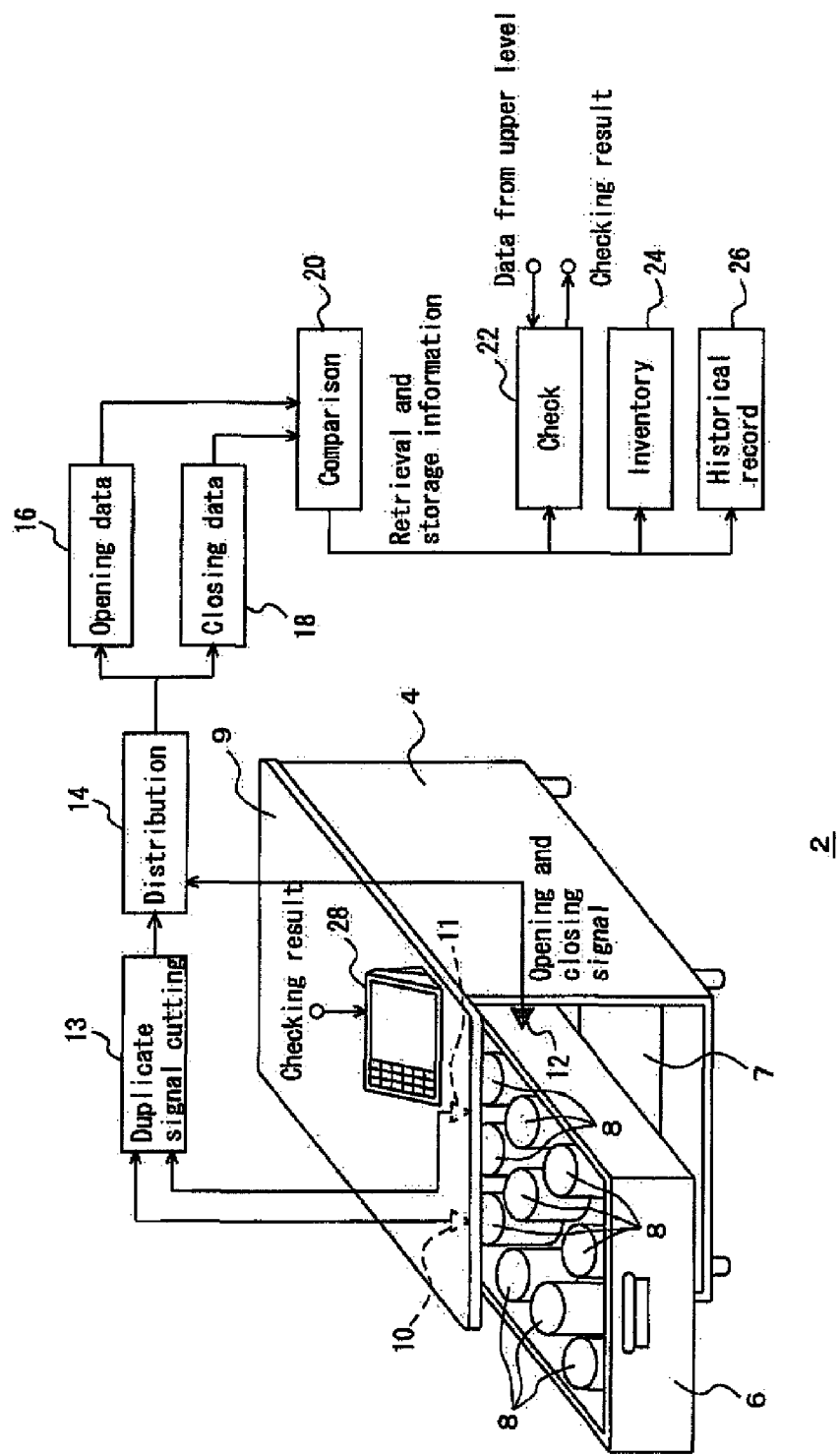
FIG. 1 is a block diagram showing a storing system according to an embodiment.

2: storing system
4: storing apparatus
6, 7: rack
8: article
9: top plate
10, 11: RFID reader
12: opening and closing sensor
13: duplicate signal cutting unit
14: distributing unit
16: opening data memory
18: closing data memory
20: comparing unit
22: checking unit
24: inventory file
26: historical record file
28: monitor
30, 31 reading area
32: pattern
34, 35: pattern sensor
40: extension
41: RFID reader
50: RFID reader
52: stand
54: gate
56: distributor
58, 59: frame
62: database
64: upper level computer
66: voice recognition unit

BEST MODE FOR CARRYING OUT THE INVENTION

Hereinafter, embodiments in the most preferred form for carrying out the present invention will be described.

Embodiments

FIG. 1 to 8 show the embodiments and modified embodiment. Unless specifically noted, the disclosure of the basic embodiment is applicable to a modified embodiment and a second embodiment. In the drawings, a reference numeral 2 denotes a storing system, a reference numeral 4 denotes a storing apparatus, and reference numerals 6 and 7 denote racks (drawers) in upper and lower two stages. The racks 6 and 7 can be moved manually back and forth between a storage position and a position where articles are retrieved from, or stored in the racks 6 and 7. It is assumed that the storing apparatus 4 is a fixed storage rack. Alternatively, the storing apparatus 4 may be a wagon having drawers. Reference numerals 8 denote articles placed in the rack 6 or the like. It is assumed that an ID tag such as an RFID is attached to each of the articles. The ID has data for each of individual articles in addition to the product number of the article. A unique ID is assigned to each of the individual articles.

The top plate 9 of the storing apparatus 4 protrudes toward the front side beyond the font surface of the storing apparatus 4. ID readers such as RFID ID readers 10, 11 are provided for reading IDs of articles in the racks 6, 7. The numbers of RFID readers 10, 11 are determined such that the RFIDs of the articles can be read at the time of closing or opening the racks 6, 7. The RFID readers 10, 11 read the IDs in the racks 6, 7 in upper and lower two stages. The RFID reader may be provided for each of the racks 6, 7. A reference numeral 12 denotes an opening and closing sensor. A similar sensor is also provided at the lower rack 7 for detecting at least whether the racks 6, 7 are opened or closed. Preferably, further, whether the racks 6, 7 are being opened or closed are detected, i.e., moving directions of the racks 6, 7 are determined. The racks 6, 7, and the box casing of the storing apparatus 4 is made of metal, or made of electrically conductive material. For example, coating material for absorbing electrical wave is applied to the surfaces of the racks 6, 7 and the box casing facing the RFID readers 10, 11 such that the racks 6, 7, and the box casing are shielded from the excessive electrical wave. In this manner, when the racks 6, 7 are partially opened, RFID tags still hidden in the racks 6, 7 do not react with the electrical wave from the ID readers.

Next, a signal processing system for the RFID readers 10, 11, and the opening and closing sensor 12 will be described below. A reference numeral 13 denotes a duplicate signal cutting unit. When a pair of the RFID readers 10, 11 output the same IDs, one of the IDs is cut for eliminating duplication. The duplicate signal cutting unit 13 may not be provided. A distributing unit 14 distributes the read IDs depending on the state where the rack 6 or 7 is being opened or the state where the rack 6 or 7 is being closed. That is, it the case where the rack 6 or 7 is being opened, the read IDs are stored in the opening data memory 16, and in the case where the rack 6 or 7 is being closed, the read IDs are stored in the closing data memory 18. A comparing unit 20 determines the difference between the IDs stored in the opening data memory 16 and the IDs stored the closing memory 18, and determines the IDs of the articles 8 stored in, and retrieved from the rack 6 or 7. This data is referred to as the retrieval and storage information for the articles.

A checking unit 22 compares IDs of articles that need to be retrieved from, and stored into the racks 6, 7, with the retrieval and storage information, and outputs the checking result. Inventory files 24 have inventory data of the racks 6, 7. Each time retrieval and storage information of the articles is determined by the comparing unit 20, based on the information, the inventory data is updated. A historical record file 26 stores retrieval and storage information of the articles together with the time or order of retrieval and storage of the articles. The time herein may be time information up to the unit date, or may be detailed time information including the unit of second. In the case where IDs of articles retrieved from, and stored in the racks 6, 7 match the data inputted from the upper level computer or the like, the checking unit 22 reports the result to the upper level computer or the like, and display the result on a monitor 28. In the case where IDs of articles retrieved from, and stored in the racks 6, 7 do not match the data inputted from the upper level computer, the result is reported to the upper level computer, and the checking unit 22 issues an alarm, e.g., by images and sounds on the monitor 28.

Figure 2:
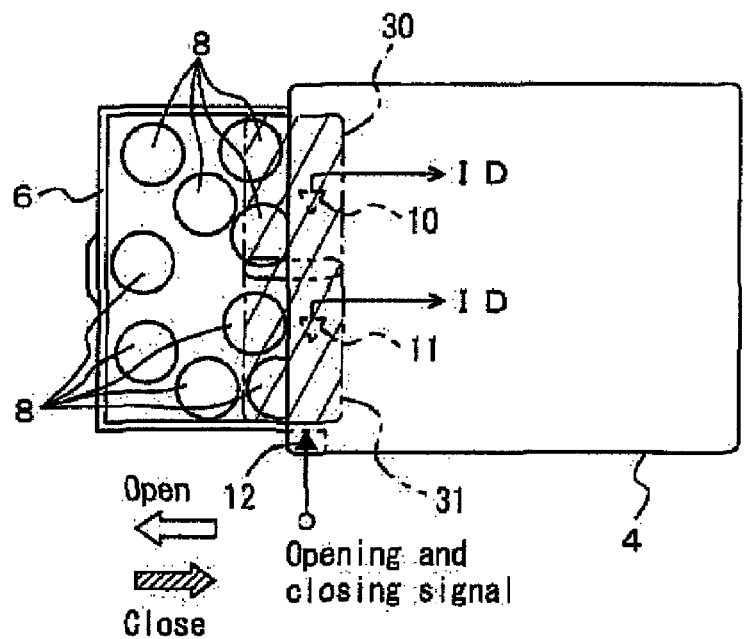
FIG. 2 is a plan view showing main components of a storing system according to the embodiment.

FIG. 2 shows reading areas 30, 31 for the RFID readers 10, 11. When the rack 6 or 7 starts to be opened, the opening and closing sensor 12 can detect the movement. Thus, operations of the RFID readers 10, 11 are started. By partially overlapping the reading areas 30, 31 to ensure that all the articles in the racks 6, 7 pass under the reading areas 30, 31, it becomes possible to detect all the IDs of the articles by the RFID readers 10, 11. It should be noted that it is not necessary to read all of the articles in the rack 6 and 7 by the RFID readers 10, 11. It is sufficient to read IDs of the articles 8 in the reading areas 30, 31 by the RFID readers 10, 11 when the rack 6 or the rack 7 is opened or closed. That is, at the time of opening the rack 6 or 7, the IDs of the articles 8 are read, and also at the time of closing the rack 6 or 7, the IDs of the articles 8 are read. By determining the difference, it is possible to determine the IDs of the articles 8 retrieved from, and stored in the rack 6 or 7.

Figure 3:
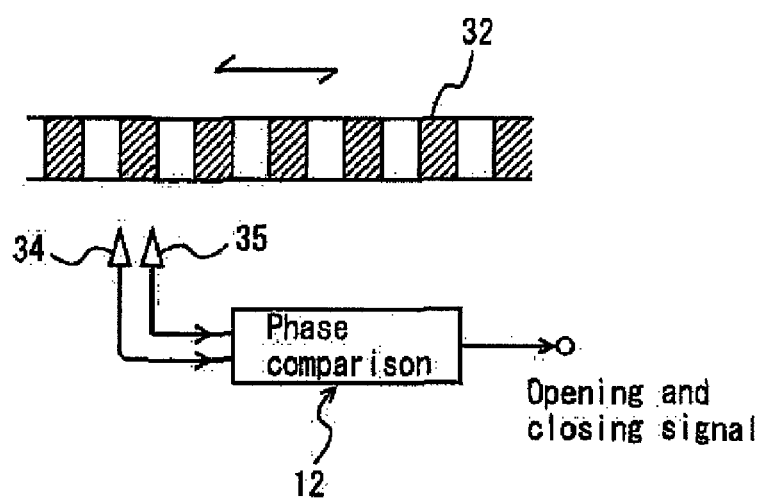
FIG. 3 is a view showing opening and closing detection according to the embodiment.

Operation of the opening and closing sensor 12 will be described with reference to FIG. 3. A pattern 32 such as a color tape or a magnetic tape is provided along the direction in which the racks 6, 7 move back and forth. The pattern 32 changes at a predetermined pitch. A pair of pattern sensors 34, 35 are provided to read the patter. By detecting the pattern 32, it is possible to detect the opening state of the rack 6 or 7. Further, when the pattern 32 moves to the left or right in FIG. 3, based on the phase at the time of detecting the edge in the change of pattern using the pair of sensors 34, 35, it is possible to detect whether the rack 6 or 7 is being closed or opened. In this manner, by obtaining an opening and closing signal, the state of the rack 6 or 7, whether the rack 6, 7 is closed or opened, and the moving direction of the rack 6, 7 are detected.

Figure 4:
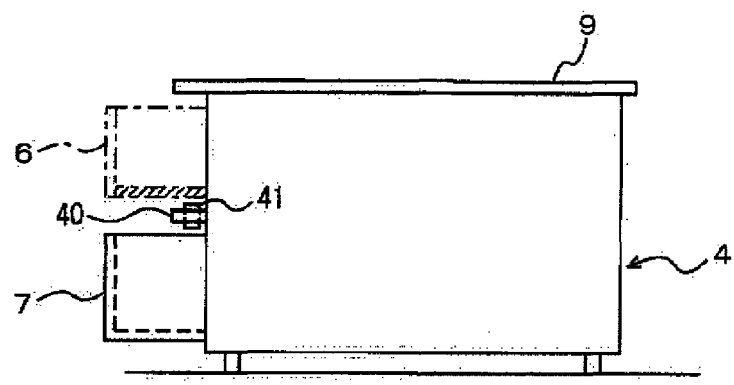
FIG. 4 is a view showing main components of a storing system according to a modified embodiment.

FIG. 4 shows a modified embodiment. An extension 40 is provided between the upper and lower racks 6, 7, and an RFID reader 41 is provided at the extension 40. Antennas of the RFID reader 41 are oriented to both of the upward direction and the downward direction for making it possible to communicate with the racks 6 and 7 reliably. The bottom surface of the rack 6 is made of an insulating member such as plastic for allowing communication with the RFID reader 41.

Figure 5:
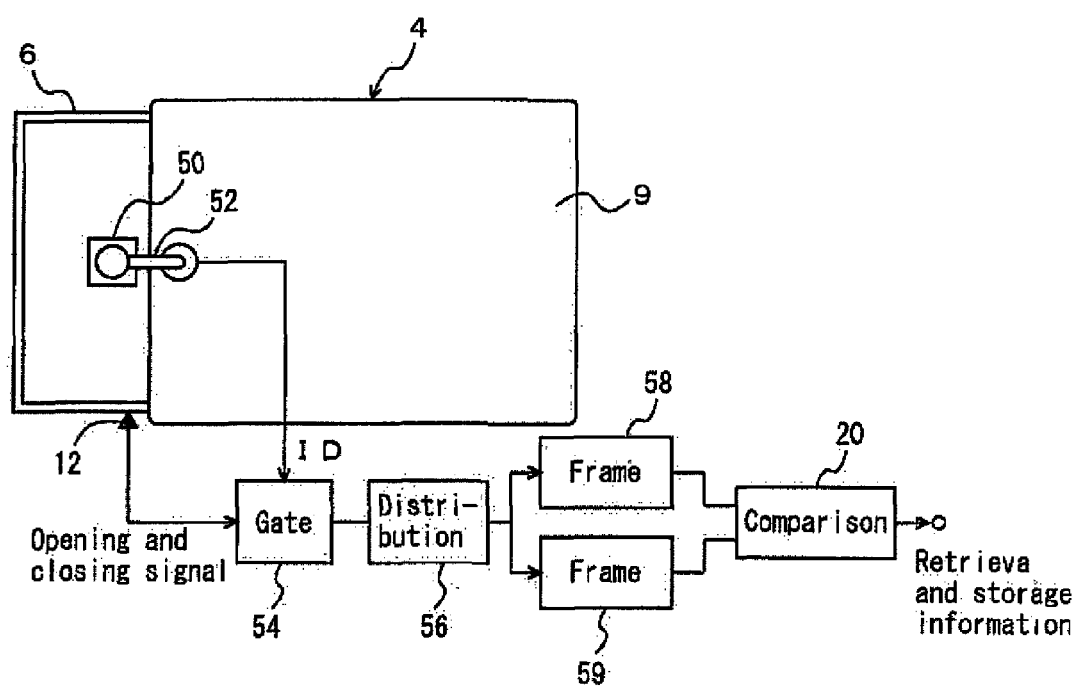
FIG. 5 is a block diagram showing a storing system according to a second embodiment.

FIG. 5 shows a second embodiment. A reference numeral 50 denotes an RFID reader. The RFID reader 50 is positioned such that when the rack 6 or 7 is opened using a stand attached to the top plate 9, all the RFIDs in the rack 6 or 7 can be read at the same time. In the example of FIGS. 1 to 4, when the rack 6 or 7 is opened, the articles pass through the reading areas of the RFID readers 10, 11, 41 where IDs can be read. Therefore, at this time, the IDs of the articles are scanned. In contrast, in the embodiment of FIG. 5, when the rack 6 or 7 is opened, IDs of all the articles in the opening range (opening area) of the rack are scanned at the same time by the RFID reader 50. Therefore, when a large number of RFID readers are required, by arranging the RFID readers in parallel, and if necessary, by attaching an antenna with high directivity, overlapping of the reading areas is minimized.

For example, the RFID reader 50 reads IDs of the articles 8 periodically, e.g., in the cycle of 0.1 to 3 seconds. Among the signals from the RFID reader 50, preferably, signals during the movement of the rack 6 or 7 are cut by a gate 54. Two frames 58, 59 are provided for storing lists of IDs. Using a distributor 56, the read IDs are stored alternately in frames 58, 59. Further, the comparing unit 20 determines the difference between the IDs in the frame 58 and the IDs in the frame 59 to obtain the retrieval storage information.

Figure 6:
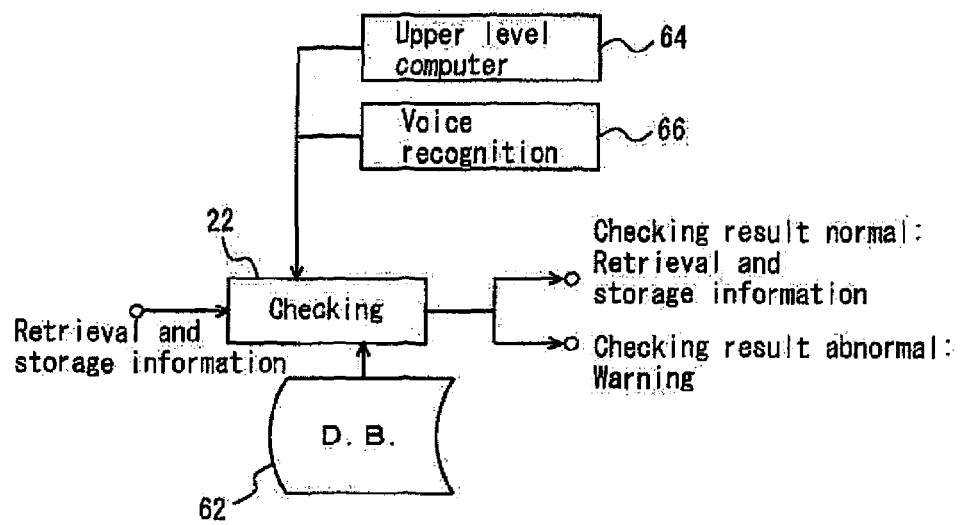
FIG. 6 is a block diagram showing checking of retrieval and storage information according to the embodiment.
Figure 7:
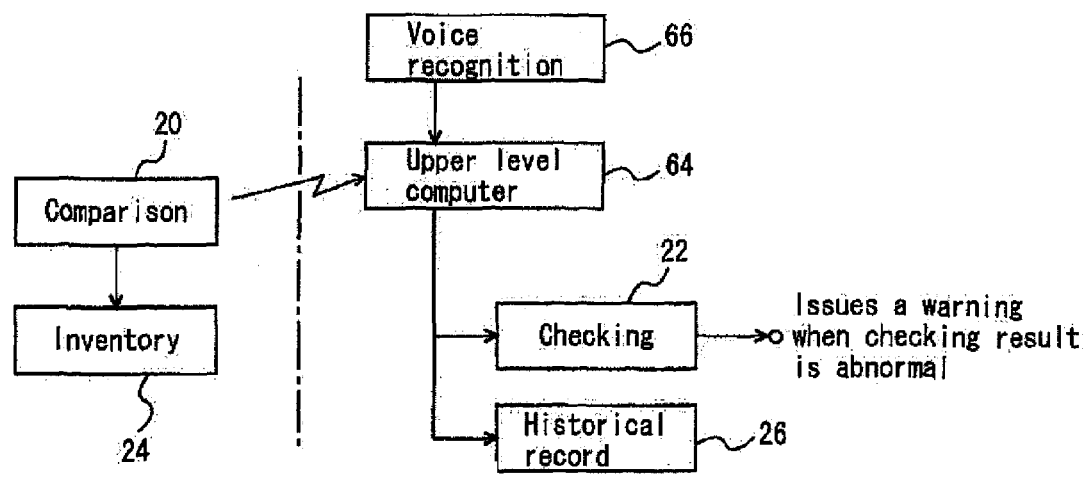
FIG. 7 is a block diagram showing checking of retrieval and storage information according to a modified embodiment.

FIGS. 6 and 7 show two models in connection with the checking unit 22. In the model of FIG. 6, IDs of articles to be retrieved or stored are inputted from the upper level computer 64 to the checking unit 22, and the inputted IDs are compared with the retrieval and storage information for checking. If the checking result is normal, the retrieval and storage information is directly outputted. If the checking result is not normal, a warning is issued by the upper level computer 64 and the monitor 28. In the case where it is difficult to input IDs of the articles 8 to the upper level computer 64, for example, a voice recognition unit 66 is provided, and names of the articles 8 to be retrieved or stored, or other keywords are inputted. Based on the keywords, a list of IDs of articles 8 for which retrieval and storage are permitted is stored, and comparison with the list is made. In the model of FIG. 7, the checking unit 22 and the historical record file 26 are provided on the upper level computer 64 side. In this case, the storing system includes the upper level computer 64.

Figure 8:
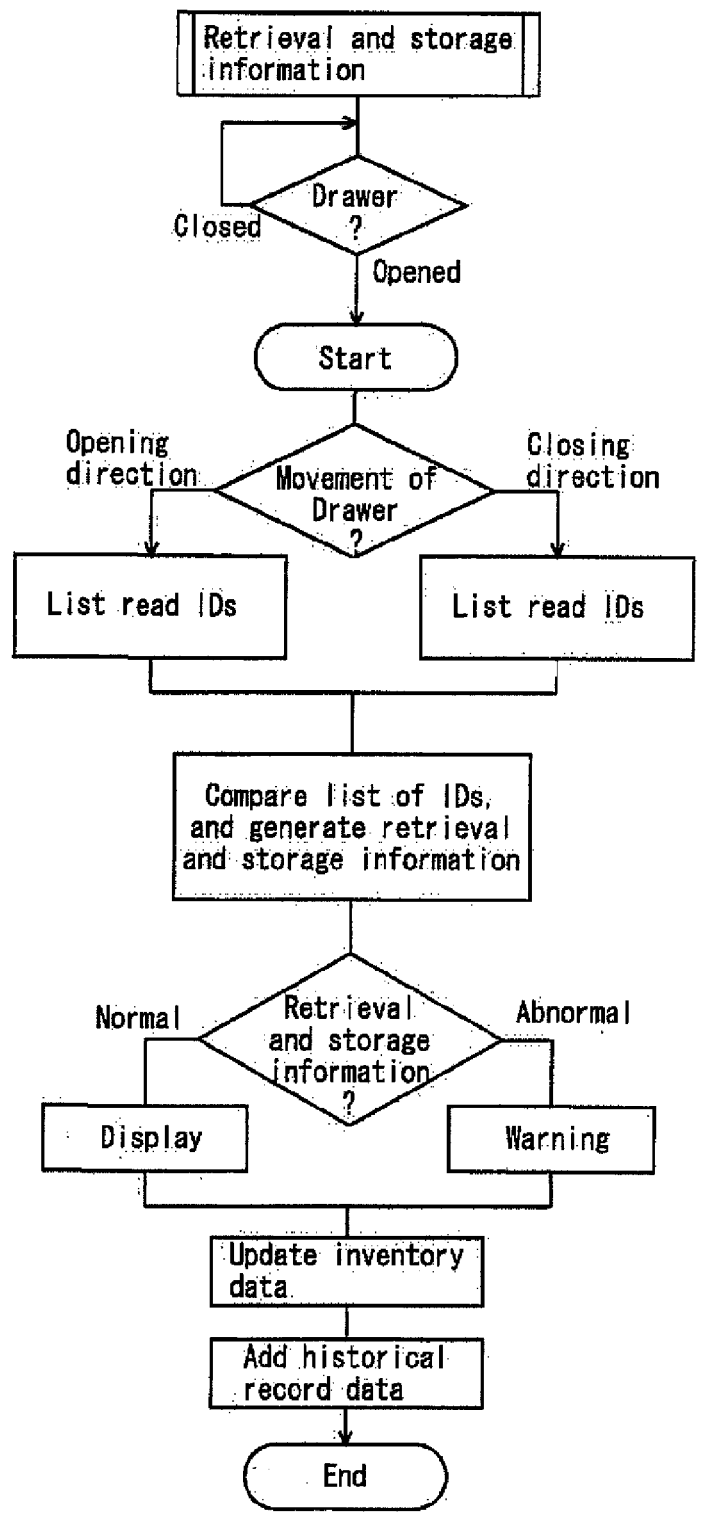
FIG. 8 is a flow chart showing steps from acquisition to processing of retrieval and storage information according to the embodiment.

FIG. 8 shows an algorithm of the embodiment. When it is detected that the drawer is opened by the opening and closing sensor, the RFID reader is turned on, and moving direction of the drawer is determined by the opening and closing sensor. In both of the case where the drawer is moving in the opening direction and the case where the drawer is moving in the closing direction, IDs of the articles in the reading area are read, and a list of the IDs is stored in an opening data memory or a closing data memory. When the rack is closed, the list of IDs in the opening data memory and the list of IDs in the closing data memory are compared with each other, and retrieval and storage information is created. In the case where the IDs of the retrieved and stored article 8 retrieved are acceptable, the result is displayed. In the case where the IDs of the stored and retrieved articles 8 are not normal, a warning is issued, e.g., by the monitor and the upper level computer. Further, the inventory data is updated, and historical record data is added.

For example, the embodiment is applicable to control of retrieval and storage of medical products and medical instruments in an emergency medical center. In this case, IDs of the articles 8 are read automatically in the manner as in the case of the embodiment, for reading of the IDs, it becomes unnecessary to hold every article to be retrieved or stored over the RFID reader. Further, in this case, when a doctor shouts symptoms and medical procedures to staff, keywords are extracted by the voice recognition unit, and the range of IDs of medical products and instruments retrieved from the database can be inputted to the checking unit. In this case, the historical record file is used as a record indicating which patient was treated, and what medical procedures were taken for the patient, and helpful for detecting the presence of any errors in medical treatment, and the cause of such errors. Further, in this case, in the data of storage and retrieval of the articles 8, data of retrieval of the articles from the storage apparatus is important. Files related to setting to the storage apparatus and the inventory are not specially important.

Additionally, the embodiment is applicable to storage of noble metals or goods in temporal charge, safekeeping of securities. Although the RFIDs are used in the embodiment, other IDs such as two-dimensional barcodes may be used. Further, in the embodiment, the positions of the articles 8 can be roughly estimated by combining the IDs read by the RFID reader and signals from the opening and closing sensor 12. If further detailed information regarding the positions of the articles 8 is required, for example, a CCD camera equipped with a fish-eye lens should be additionally provided.

In the embodiment, reading is performed twice, at the time of opening the drawer, and at the time of closing the drawer. However, the present invention is not limited in this respect. For example, in the case where the drawer cannot be opened or closed partially (the drawer can only be fully opened, or fully closed), at the time of closing the drawer, IDs are read. By determining the difference from the previous reading value of IDs, it is possible to determine the IDs and positions of the articles that are retrieved or stored this time. For example, the CCD camera and the RFID camera may be used in combination to store the IDs and positions of the articles. At the time of closing the drawer, the IDs and positions of the articles are stored. By comparing the current data with the previous data, it is possible to determine the IDs of the articles that are retrieved or stored this time.

Advantages of the embodiments will be described.

(1) It is not necessary to hold every article to be retrieved or stored over the RFID readers 10, 11.

(2) Since IDs of the articles 8 within the opening range of the rack 6 or 7 are read, it is possible to manage the data of retrieval and storage regardless of whether the rack 6 or 7 is opened a little or a lot".

(3) It is possible to issues a warning when any inappropriate article is retrieved or stored.

(4) It is possible to create a historical record for retrieval and storage of the articles 8, and create an inventory file.

The invention claimed is:

1. A storing system for storing articles comprising:
    a drawer in which articles having IDs are placed, the drawer being movable in an opening direction and in a closing direction;
    an ID reader for reading the IDs of articles located in a reading area of the ID reader, the ID reader being positioned at a front side of the drawer when the drawer is in a closed state and being positioned in such a way that articles in the drawer that pass through the reading area as the drawer is moved are read by the ID reader simultaneously with movement of the drawer in the opening direction and simultaneously with movement of the drawer in the closing direction; and
    identification means for generating a list of IDs of articles read by the ID reader in response to the drawer being moved in the opening direction and in response to the drawer being moved in the closing direction, and for identifying the articles retrieved from or stored in the drawer, based on a difference between the list generated in response to the drawer being moved in the opening direction and the list generated in response to the drawer being moved in the closing direction.

2. The storing system according to claim 1, further comprising:
    checking means for determining articles being allowed to be retrieved from or stored in the drawer, and for comparing the articles being allowed to be retrieved with the articles identified by the identification means so as to check appropriateness of the articles retrieved from or stored in the drawer; and
    warning means for warning any inappropriateness found by the checking means.

3. The storing system according to claim 1, further comprising means for generating a historical record of articles retrieved from or stored in the drawer.

4. The storing system according to claim 1, further comprising a sensor for determining whether the drawer is being opened or being closed.

5. A storing system for storing medical products, comprising:
    a drawer in which medical products having IDs are placed, the drawer being movable in an opening direction and in a closing direction;
    an ID reader for reading the IDs of medical products located in a reading area of the ID reader, the ID reader being positioned at a front side of the drawer when the drawer is in a closed state and being positioned in such a way that medical products in the drawer that pass through the reading area as the drawer is moved are read by the ID reader simultaneously with movement of the drawer in the opening direction and simultaneously with movement of the drawer in the closing direction; and
    identification means for generating a list of IDs of medical products read by the ID reader in response to the drawer being moved in the opening direction and in response to the drawer being moved in the closing direction, and for identifying the medical products retrieved from and stored in the drawer, based on a difference between the list generated in response to the drawer being moved in the opening direction and the list generated in response to the drawer being moved in the closing direction.

6. The storing system according to claim 5, further comprising:
    voice recognition means for recognizing keywords;
    a database for outputting a list of medical products allowed to be retrieved from or stored in the drawer, in response to the recognized keywords;
    checking means for comparing the list from the database with medical products retrieved from the drawer; and
    warning means for warning inappropriateness found by the checking means.

7. The storing system according to claim 5, further comprising means for generating a historical record of medical products retrieved from or stored in the drawer.

8. The storing system according to claim 5, further comprising a sensor for determining whether the drawer is being opened or being closed.

* * * * *